July 21, 1931.   S. L. MATHEWS   1,815,206
AUTOMATIC BURGLAR ALARM FOR AUTOMOBILES
Filed Aug. 30, 1923   3 Sheets-Sheet 1
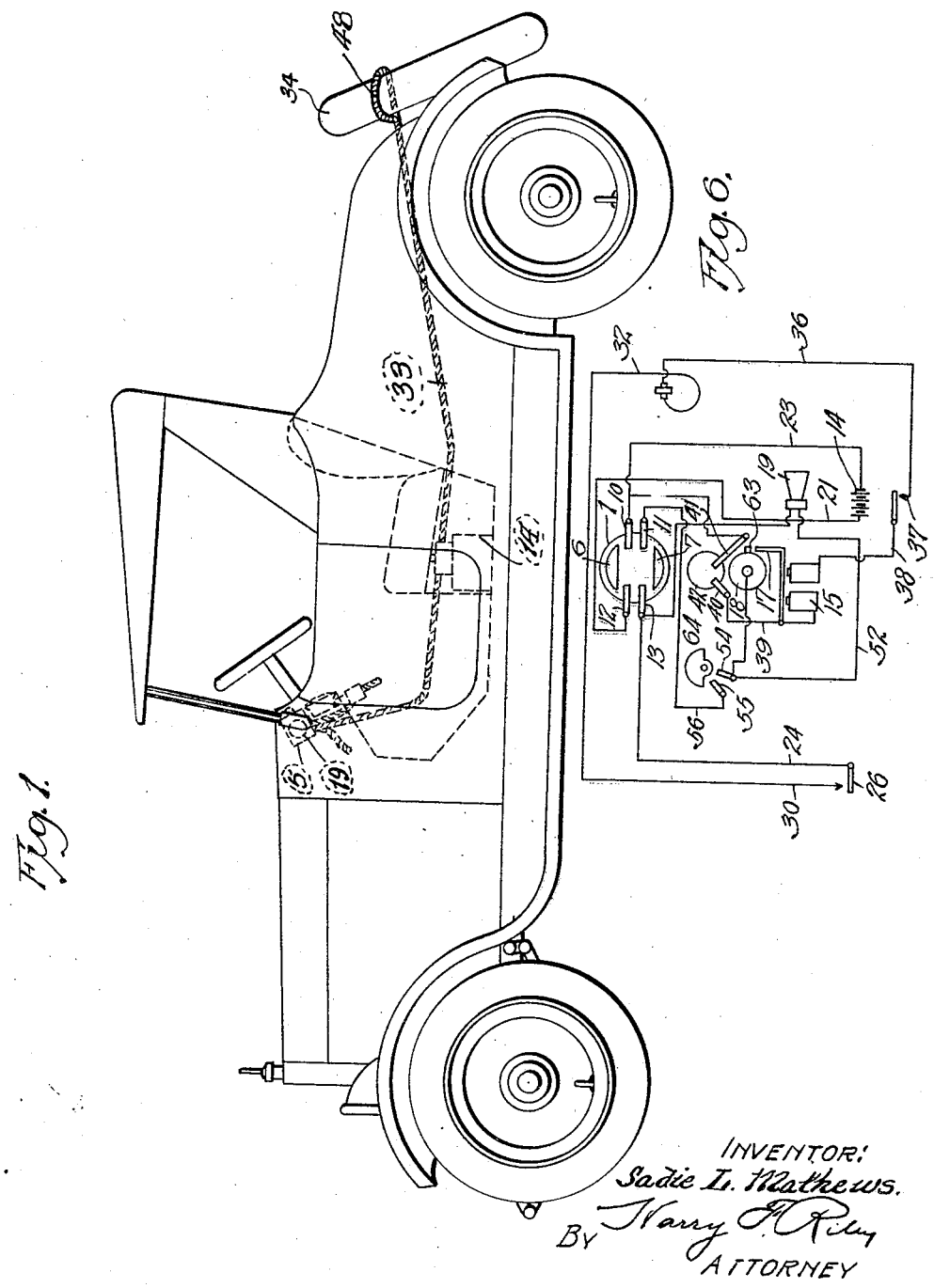

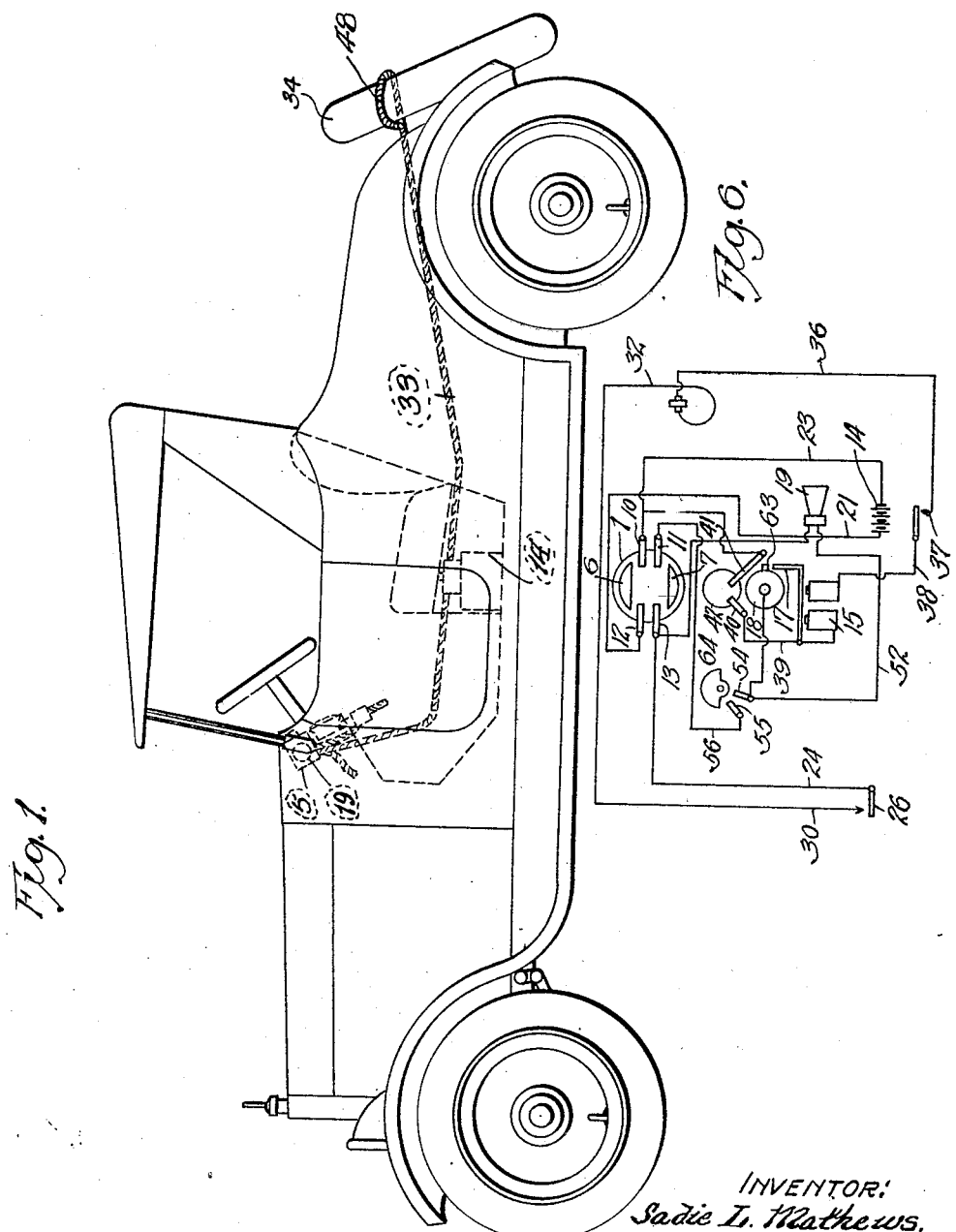

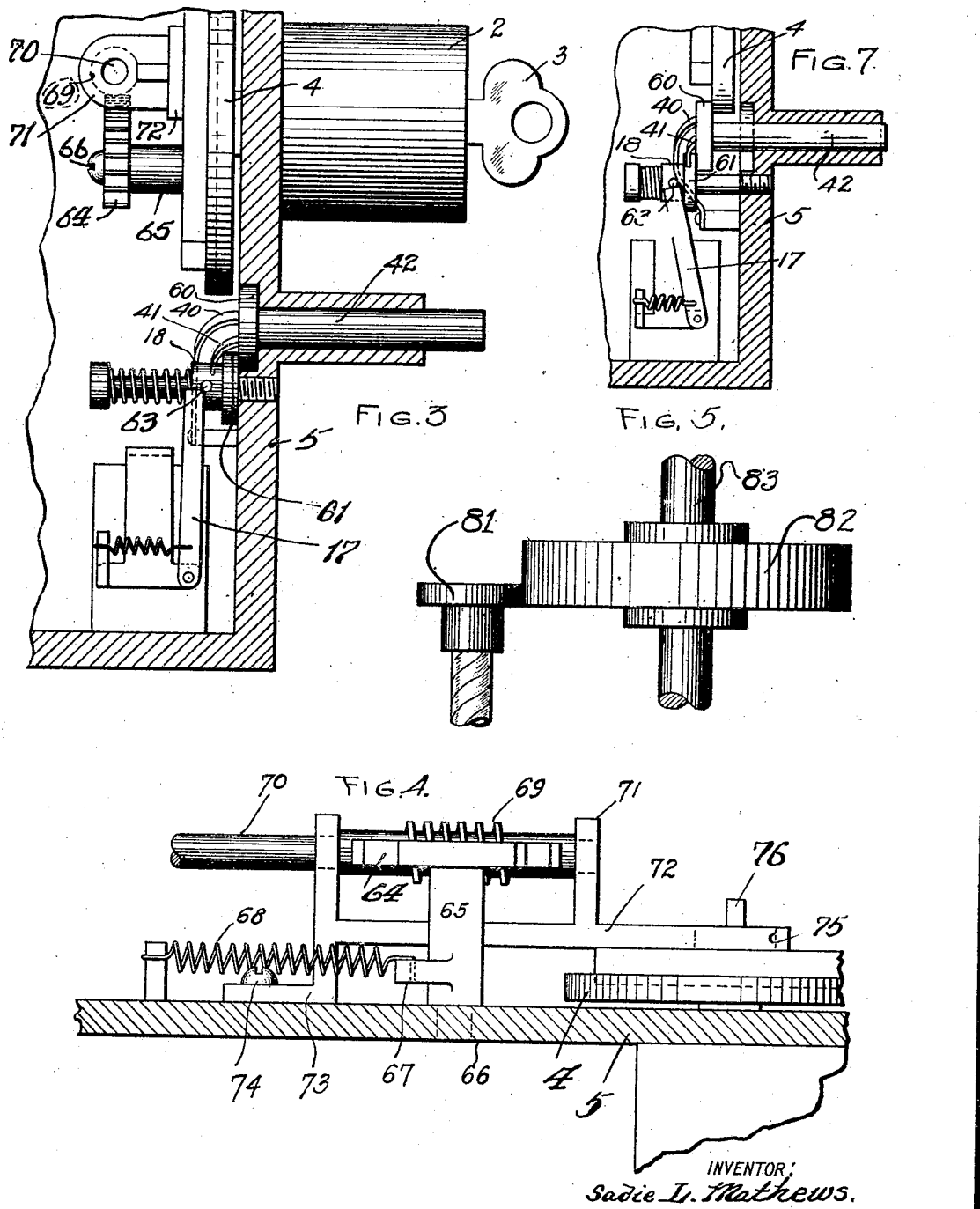

Patented July 21, 1931

1,815,206

UNITED STATES PATENT OFFICE

SADIE L. MATHEWS, OF ST. LOUIS, MISSOURI

AUTOMATIC BURGLAR ALARM FOR AUTOMOBILES

Application filed August 30, 1923. Serial No. 660,195.

The invention relates to an automatic burglar alarm for automobiles.

The object of the present invention is to provide an automobile alarm equipped with lock controlled mechanism adapted to be operated by key to open and close the ignition circuit or system of an automobile and simultaneously set or throw out of operation the alarm mechanism and adapted also, when the alarm mechanism is set for automatic operation, to sound continuously an audible alarm should an unauthorized person attempt to remove a spare tire, or tamper with the alarm mechanism, or move the automobile either forwardly or rearwardly by towing or otherwise beyond a predetermined number of feet, whereby the owner and other persons will be warned of such attempted theft thereby rendering it practically impossible for either the automobile or the spare tire to be stolen.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 1 is a side elevation of an automobile equipped with an automatic alarm constructed in accordance with this invention, the position of the parts being illustrated in dotted lines.

Figure 3 is an enlarged vertical view through the casing, parts being omitted for convenience of illustration.

Figure 4 is an enlarged detail view illustrating the manner of slidably mounting the worm shaft and the means for connecting the same with the lock controlled switch.

Figure 5 is an enlarged detail view showing friction gearing, which may be attached to some movable part of any automobile, especially to such cars as the Ford car where a speedometer or generator is not attached to car and runs from magneto.

Fig. 6 is a diagrammatic view of the alarm mechanism and electrical connections.

Fig. 7 is a detail vertical sectional view similar to Fig. 3 showing the circuit closing position of the manually operable plunger.

Figure 2:
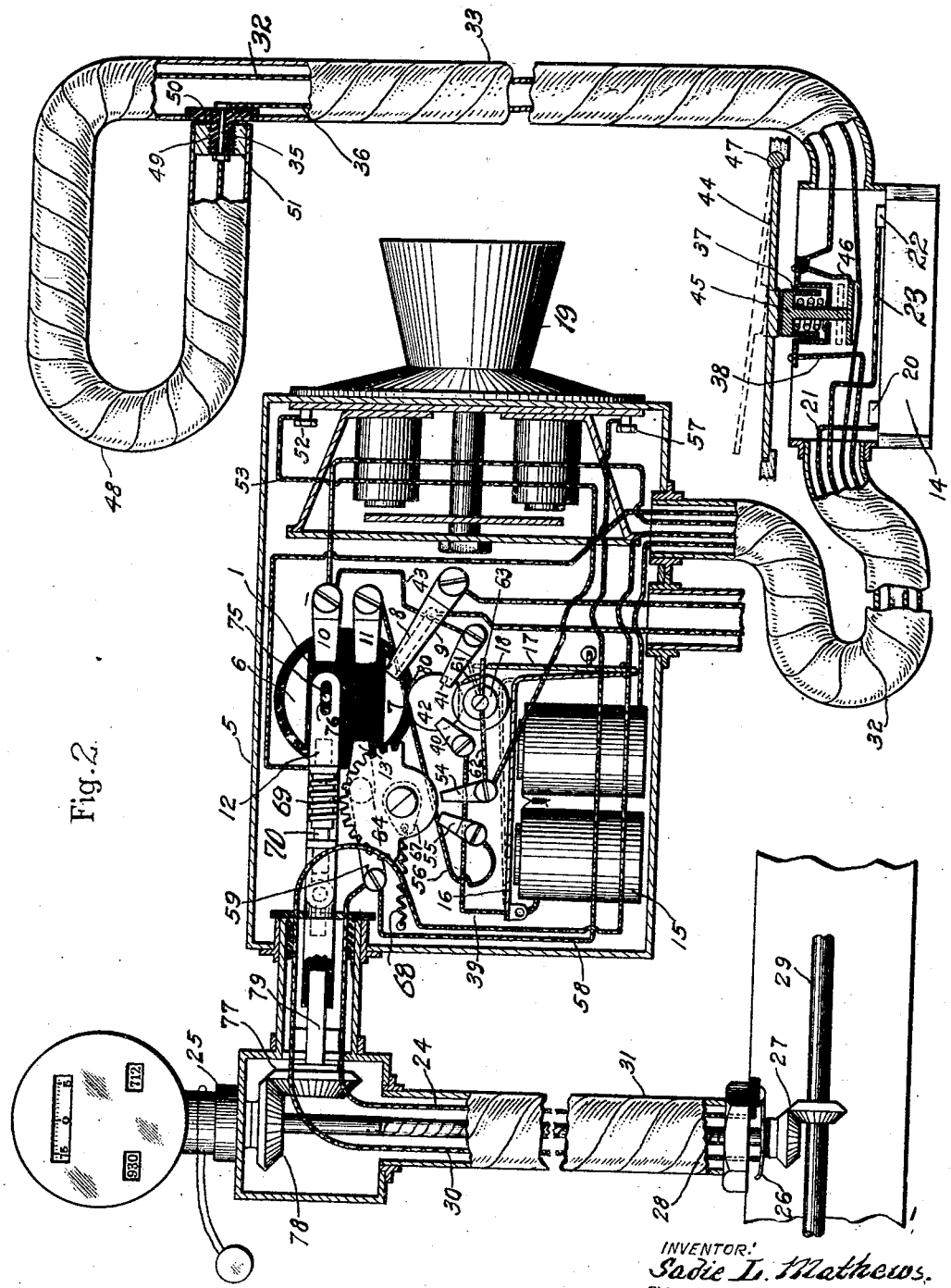
Figure 2 is a sectional view partly in elevation, illustrating the automobile alarm.

In the accompanying drawings, in which is illustrated the preferred embodiment of the invention, the automobile alarm comprises in its construction a lock controlled switch 1 consisting of a cylinder lock 2 of the usual construction having a key 3 and provided at the end of its rotary member with a fiber disk 4 constituting the body of the switch. As the lock 2 is of the usual construction and operates in the ordinary manner further description thereof is deemed unnecessary. The lock is mounted on a substantially rectangular casing 5 and is designed to extend through the dash of an automobile in the general position indicated in Figure 1 of the drawings and the switch is adapted to be rotated through one-fourth of a revolution by the lock for arranging spaced parallel segmental contact plates 6 and 7 either in horizontal position as shown in Figure 2 of the drawings, or in a vertical position to set the alarm mechanism or to throw the same out of operation. When the contact plates of the lock controlled switch are in horizontal position, as illustrated in Figure 2, the automatic alarm mechanism is out of operation and the lower contact plate 7 of the alarm is in electrical contact with contacts 8 and 9 of the ignition circuit or system of the automobile and when the switch is rotated to arrange the contact plates 6 and 7 in a vertical position the contact plate 7 is carried away from the ignition circuit contacts 8 and 9 to make a break in the said circuit or system and to prevent the operation of the engine of the automobile. It will thus be clear that when the switch is operated to set the alarm it will cut out the ignition circuit and that when the alarm is thrown out of operation by the switch it restores the ignition circuit to its previous condition by closing the break between the contacts 8 and 9. The segmental contact plates of the switch are seated in recesses in the fiber disk, but the disk may be made of any suitable non-conducting material and the contact plates may also be constructed of any suitable conducting material.

The contact plates of the lock controlled switch cooperate with spaced pairs of contacts 10, 11, 12 and 13 located at opposite sides of the switch and insulated from one another and also from the casing. The contact plates 6 and 7 of the switch are spaced apart a sufficient distance to clear the pairs of contacts 10, 11, 12 and 13, when the contact plates 6 and 7 are in a horizontal position, and when the switch is partially rotated by the operation of the lock the contact plates 6 and 7 bridge the spaced pairs of contacts 10, 11, 12 and 13 and close the gaps between the same. In the operation of the cylinder lock the key can be removed from the lock only when the contact plates 6 and 7 are in a vertical position, the key being left in the lock when the automobile is in use and the parts arranged as shown in Figure 2 of the drawings. The alarm will, therefore, always be properly set when the key is removed from the lock. Spaced pairs of contact plates constitute breaks in a normally closed main circuit in which is arranged a battery 14 and a double electro-relay magnet 15 having a spring armature 16 automatically movable away from the relay magnet when the latter is de-energized to carry a finger 17 of the armature into contact with a circuit closing device 18 of an alarm circuit. When the electro-magnet 15 is de-energized by a break in the normally closed circuit the alarm circuit, which includes an electric horn 19, will be closed by the operation of the circuit closing device 18 and the alarm will be continuously sounded until the mechanism is reset. This operation of the closed main circuit through the relay magnet will prevent tampering with the mechanism and a break in the main circuit at any point will produce a ringing of the alarm. Instead of employing an electric horn any other audible electrically operated alarm or signal may be installed in the alarm circuit for operation when the alarm circuit is closed.

One pole 20 of the battery 14 is connected by a wire 21 with the upper left-hand contact 12 of the lock controlled switch and the other pole 22 of the battery is connected by a wire 23 with the upper right-hand contact 10 of the switch. When the switch is operated to set the alarm mechanism the current from the battery flows through the wire 21 to the upper left-hand contact 12 and across the gap between the contacts 12 and 13 and through a wire 24 which extends through the speedometer 25, with which the automobile alarm is associated. The wire 24 extends through the cable of the speedometer and is connected with a spring contact plate 26 located at the gearing 27 which connects the flexible shaft 28 of the speedometer with the drive shaft 29 of the automobile. The spring contact 26 and the wires are properly insulated from the cable containing the flexible shafting of the speedometer and the said spring contact plate is maintained in electrical contact with one terminal of a wire 30 by the said gearing so that should the gearing 27 be removed, in an attempt to interfere with the operation of the alarm, the main normally closed circuit will be broken at the spring contact plate 26, which will result in de-energizing the relay magnet and closing the alarm circuit. The wire 30 is returned through a cable 31 of the speedometer and passes through the casing 5 and also through a cable 32 containing the wires which extend from the battery to the casing 5. This wire 30 also passes through a looped cable 33, which is adapted to encircle a spare tire 34, as illustrated in Figure 1 of the drawings, and is connected at the rear end of the cable 33 by a bolt 35 or other suitable connection with a return wire 36 extending to a circuit opening and closing device 37 and the latter is connected by a wire 38 with one terminal of the electromagnet 15. The other terminal of the electromagnet is connected by a wire 39 with one of a pair of contacts 40 and 41 associated with a manually operable push plunger circuit closing device 42. The other contact 41 is connected by a wire 43 with the upper right-hand contact of the switch. This completes the main normally closed circuit. The battery is preferably located beneath the seat 44 of the automobile and the circuit opening and closing device 37 consists of a spring actuated push button 45, normally maintained in electrical engagement with a contact 46, and adapted, should the seat be raised as illustrated in dotted lines of Figure 2 of the drawings, to make a break in the main normally closed circuit and de-energize the relay magnet and close the alarm circuit. The seat is hinged at 47 and the circuit opening and closing device 37 may, of course, be of any other desired construction. The loop 48 in the cable 33 is adapted to encircle the spare tire and the terminals of the wires 30 and 36 are insulated from the cable by fiber insulation 49 and 50. The insulation 50 is mounted within the cable and the brass bolt 35 extends through the insulation 50 and makes contact with the adjacent terminal of the wire 36. The insulation 50 is provided with a core or extension 51 which extends into the insulation 49. The insulation 49 is in the form of a sleeve and cooperates with the core or extension 51 to form a slip joint, a frictional contact being preferably employed to maintain the parts in position, but any other suitable form of connection may, of course, be provided for this purpose. The opening of the loop to remove the same from the spare tire will close the alarm circuit.

The upper terminal 52 of the electric horn is connected by a wire 53 with one of a pair of spaced alarm contacts 54 and 55, and the other contact 55 is connected by a wire 56 with the lower right-hand switch contact 11. The other terminal 57 of the horn is connected by a wire 58 with the lower left-hand switch contact 13, a bus bar 59, or other suitable connection, connecting the wires 24 and 58 with the contact 13. Any other suitable means, however, may be employed for this purpose.

The push plunger 42, which is manually operable, is slidably mounted in the casing and is designed to extend through the dash of the automobile and is provided at its inner end with a head 60 which cooperates with the contacts 40 and 41 and is adapted to close the gap between the contacts and is also adapted to be operated to open the space and form a gap between the contacts 40 and 41. The plunger is employed to close the main circuit or leave it open as desired, leaving button out allows no current to pass through the relay magnet. In this way the spare tire and other movable parts could be removed without sounding the alarm. When the car is stopped and it is desired to set the alarm mechanism, the plunger 42 is pushed inwardly and the head of the plunger 42 is moved through a recess 80 in the disk 4, which when partially rotated in the locking operation of the car, will maintain the plunger 42 in electrical engagement with the contacts 40 and 41. This partial rotary movement of the disk 4 also closes the space between the contacts 10 and 11, and the normally closed main circuit is fully closed and any break in the circuit will cause a sounding of the alarm.

If it is desired to change a tire, the car is stopped and the lock turned to open the ignition circuit. This operation of the lock partially rotates the disk 4 and closes the space between the contacts 10 and 11. Under these conditions, the plunger is not operated to close the space between the contacts 40 and 41, and the normally closed main circuit remains open, and the spare tire may be removed without sounding the alarm, which would not be the case were the plunger 42 operated to close the space between the said contacts 40 and 41. But the car in the main is protected insomuch should the car be moved or towed a predetermined number of feet either forward or backward, the alarm will ring.

Should the seat be raised, or the loop 48 opened, or the gear 27 be displaced while the plunger 42 is in engagement with the contacts 40 and 41 and the car is locked the main normally closed circuit will be opened and the magnet will be de-energized and the automatically movable relay armature will be released by the relay magnet and will move upwardly to the dotted line position shown in Figure 2 of the drawings and will partially rotate the circuit closing member 18 and cause the same to carry a contact plate 61 into electrical contact with the head 60 of the push plunger for closing the alarm circuit. This will cause the current to flow from the battery to the upper left-hand contact of the switch to the lower left-hand contact and through the wire 58 to one of the terminals of the horn and through the horn and from the other terminal of the same through the wire 53 to the contact 54, which is connected by a wire 62 with the rotary circuit closing element 18. The rotary circuit closing element 18 is provided with a projection 63 arranged to be engaged by the finger 17 of the relay armature. The current will then pass through the manually operable circuit closing plunger head 60 and through the contact 41 and through the wire 43 to the upper right-hand switch contact 10, which is connected with the battery by the wire 23. The spaced contacts 40 and 41 which form a gap in the alarm circuit are bridged by the said head 60 of the plunger 42 when the plunger is moved inwardly as illustrated in Fig. 7 of the drawings. When the electro-magnet 15 is energized as illustrated in Fig. 2 of the drawings, the armature 16 is arranged in a horizontal position and the projection 63 of the rotary switch 18 is also arranged in a horizontal position above the finger 17 of the armature as illustrated in Fig. 2 of the drawings. The contact plate 61 of the rotary switch is out of contact with the head 60 of the plunger 42 when the circuit closer 18 is in the position illustrated in Fig. 2 of the drawings so that the alarm circuit is interrupted by reason of the said contact plate 61 being out of contact with the head 60 of the plunger 42. Should the electro-magnet be de-energized the spring armature will move from the horizontal position shown in full lines in Fig. 2 to the dotted line position illustrated in the said figure and the finger 17 will engage the projection 63 of the rotary switch 18 and lift the said projection 63 from the horizontal full line position in Fig. 2 to the inclined dotted line position in said figure. This will carry the contact plate 61 into engagement with the head 60 of the plunger 42 and close the alarm circuit. When the electro-magnet is again energized, its armature 16 will be thrown down to a horizontal position and will carry with it the finger 17 which will leave the projection 63 unsupported and the latter will drop back to the horizontal position shown in Fig. 2. The gap between the contacts 54 and 55 of the alarm circuit is adapted to be closed by a gear element 64, consisting of a mutilated worm wheel provided with a bearing sleeve 65, which is mounted on a suitable shaft or pivot 66 and which is provided with a lug 67 for the attachment of a spring 68 to return the mutilated worm wheel to its normal central position when it is free to move. The worm gear is adapted to mesh with a worm 69 of a worm shaft 70, mounted in guide arms 71 of a pivoted guide bracket 72. The guide bracket 72 is provided at one end with an angle arm 73, which is pivoted by a screw 74, or other suitable fastening means, to the casing. The angle arm is located at one end of the bearing bracket, which is provided at its other end with a slot 75 for the reception of an eccentric pin 76 of the lock controlled switch. The lock controlled switch is adapted, when moved from the position illustrated in Figure 2, to lower the worm 69 into mesh with the mutilated worm gear. The worm shaft is connected by beveled gears 77 and 78 with the speedometer gearing, so that when the automobile is moved a predetermined number of feet the worm shaft will be rotated and will oscillate the mutilated gear and carry the same into circuit closing position with relation to the gap of the contacts 54 and 55. The gears may be proportioned to cause a sounding of the alarm after the machine has moved a pre-determined number of feet in either direction from the central position of the worm wheel in Figure 2 of the drawings, and the length of the series of teeth is sufficient to carry the worm gear across the gap of the contacts 54 and 55 for closing the alarm circuit and sounding the alarm.

Should the gear be moved the worm gear will be partially rotated and will close the break in the alarm circuit at the gear contacts 54 and 55. The current will then flow from the battery through the upper left-hand switch contacts to one of the terminals of the horn. The current will then flow through the horn and from the other terminal through the gear contacts through the right-hand switch contact 11 back to the battery. The worm shaft is connected by a flexible shaft 79 with the beveled gear 77.

The disk of the lock controlled switch is provided with the recess 80, which registers with the head of the push plunger 42 when the switch is in one position and is adapted to be carried out of such position by the rotary movement of the switch to arrange the disk in overlapping relation with the push plunger head for preventing movement of the same.

81 is the friction wheel, 82 is the flywheel or other rotating member, 83 is the shaft which supplies energy to actuate 81 in the event the automobile is moved more than a pre-determined distance in either direction thereby setting off the alarm or signal device as above specified and described.

What is claimed is:—

1. An automobile alarm comprising an alarm circuit having spaced contacts, switch operating gearing comprising gear elements having relative movement to carry them into and out of mesh, said switch operating mechanism having a pivoted mutilated segmental gear having a toothed peripheral portion movable over the space between the said contacts for closing and opening the alarm circuit, a lock connected with one of the said gear elements for moving the same into and out of mesh with the other gear element, and means for connecting said gear elements with the automobile running gear for rotating the same when the automobile is moved.

2. An automobile alarm including an alarm circuit having spaced contacts, a mutilated gear having a peripheral cut away portion arranged to receive the spaced contacts for opening the alarm circuit, said mutilated gear being movable across the spaced contacts for closing the alarm circuit, a worm shaft meshing with the mutilated gear, a pivotally mounted bracket carrying the worm shaft and adapted to be oscillated to move the worm shaft into and out of mesh with the mutilated gear, said bracket having a slot, a lock having an eccentric pin operating in the slot of the pivoted bracket and adapted to swing the same on its pivot, and means for connecting the shaft with the automobile running gear, said mutilated gear being adapted to be moved in either direction for closing the alarm circuit when the automobile is either moved forwardly or rearwardly.

3. An automobile alarm comprising a circuit having spaced contacts, a manually operable plunger designed to extend through the dash of an automobile and provided with a head movable into and out of electrical engagement with the said contacts for closing the gap between the same, a rotatable lock controlled switch provided with a disk having means for opening and closing the said circuit and provided with a peripheral recess adapted to be carried into and out of alignment with the said plunger and permitting the plunger to pass through it when in alignment, the lock controlled switch being adapted to carry the recess away from the plunger for locking the plunger in electrical engagement with the said contacts.

4. In combination with an automobile, a normally closed main circuit including an electromagnetic switch having its electromagnet in said circuit and key controlled means for closing the circuit, a circuit including an alarm and the contacts of said switch, a second normally open circuit including said alarm and controlled by the aforesaid key controlled means, normally open circuit closing means for closing said latter circuit, means for operating the latter by movement of the automobile including driving means for operating the normally open circuit closer.

5. In combination with an automobile a closed protective circuit associated with a part of the automobile to be protected, an electromagnetic switch having its electromagnet in said circuit, a circuit including an alarm and the contacts of said switch, a second normally open circuit including said alarm, normally open circuit closing means for closing said latter circuit, means for operating the latter by movement of the automobile including disengageable driving means and key controlled means for closing the first named circuit and moving the disengageable driving means into driving connection to operate the normally open circuit closer.

6. An automobile alarm comprising a circuit having spaced contacts forming a gap, a manually operable slidable plunger having a head arranged to engage the spaced contacts and adapted to open and close the said gap, a lock having a rotary member provided with a recess movable into and out of the path of the said head of the plunger by the said lock and the head being movable through the recess from one side of the rotary member to the other, whereby the head is adapted to be locked in engagement with the contacts in circuit closing position.

7. An automobile alarm, comprising an alarm circuit having spaced contacts, a rotatable gear element movable across the space between the contacts to open and close the alarm circuit, a second gear element, means mounting the latter for rotation and for movement into and out of engagement with the first named gear element, driving means including a universal joint between said second named gear element and the automobile running gear, a lock having a movable member and means operated by the latter for moving said mounting means to throw the second gear element into and out of engagement with the first named gear element.

8. An automobile alarm comprising an alarm circuit having spaced contacts, a rotatable gear element movable across the space between the contacts to open and close the alarm circuit, a second gear element, means mounting the latter for rotation and for movement into and out of engagement with the first named gear element, means permitting such movement for connecting the second named gear element with the automobile running gear, a lock having a movable member, and means operated by the latter for moving said mounting means to throw the second gear element into and out of engagement with the first named gear element.

9. An automobile alarm comprising an alarm circuit having spaced contacts, a mutilated rotatable gear element movable across the space between the contacts to open and close the circuit, a second gear element, means mounting the latter for rotation and for movement into and out of engagement with the first named gear element, means permitting such movement for connecting the second gear element with the running gear of the automobile, a cylinder lock, and an eccentric connection between the cylinder of the lock and the mounting means to throw the second gear element into and out of engagement with the first named gear element.

10. An automobile alarm, comprising an alarm circuit having spaced contacts, a rotatable gear element movable across the space between the contacts to open and close the alarm circuit, a second gear element, means mounting the latter for rotation and for movement into and out of engagement with the first named gear element, driving means between said second named gear element and the automobile running gear, a lock having a movable member and means operated by the latter for moving said mounting means to throw the second gear element into and out of engagement with the first named gear element.

11. An automobile alarm, comprising an alarm circuit having spaced contacts, a rotatable gear element movable across the space between the contacts to open and close the alarm circuit, a speedometer driven gear element, means for mounting the speedometer driven gear element for rotation and for movement into and out of mesh with the first mentioned gear element, a lock having a movable member, and means operated by the latter for moving said mounting means to throw the second gear element into and out of mesh with the first named gear element.

12. An automobile alarm comprising an alarm circuit having spaced contacts, a rotatable gear element movable across the space between the contacts to open and close the alarm circuit, a second gear element, means mounting the latter for rotation and for movement into and out of engagement with the first mentioned gear element, a lock having a movable member, means operated by the latter for moving said mounting means to throw the second gear element into and out of engagement with the first named gear element, and means for rotating said second gear element when a vehicle is moved either forward or rearward.

In testimony whereof she has affixed her signature.

SADIE L. MATHEWS.